Dec. 19 1922.
J. D. SIDDELEY.
WHEEL FOR MOTOR ROAD VEHICLES.
FILED JUNE 28, 1920.
1,439,269
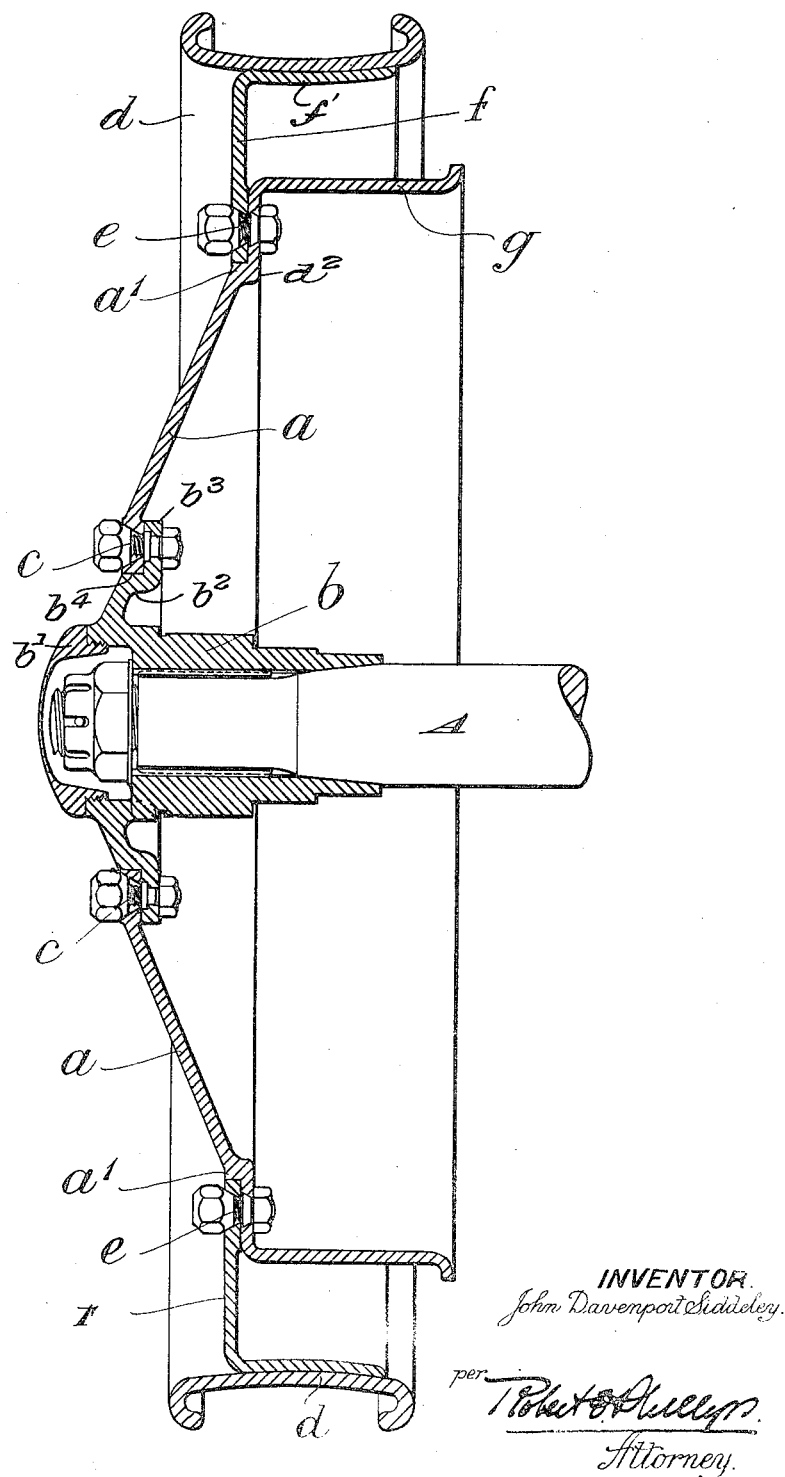
INVENTOR.
John Davenport Siddeley.
per Robert O. Cullen
Attorney.

Patented Dec. 19, 1922.

1,439,269

UNITED STATES PATENT OFFICE.

JOHN DAVENPORT SIDDELEY, OF CRACKLEY, KENILWORTH, ENGLAND.

WHEEL FOR MOTOR ROAD VEHICLES.

Application filed June 28, 1920. Serial No. 392,532.

*To all whom it may concern:*

Be it known that I, JOHN DAVENPORT SIDDELEY, a subject of the King of Great Britain and Ireland, residing at Crackley, Kenilworth, in the county of Warwick, England, have invented a new and useful Improvement in Wheels for Motor Road Vehicles, of which the following is a full and complete specification.

This invention relates to vehicle wheels of the single disk type. One of the principal objects of the invention is to provide a simple and efficient device of this character which can be cheaply constructed and which presents an unbroken and readily cleanable outer surface of neat and attractive appearance.

A further object of the invention is the provision of a device of this character in which the brake drum is formed as a part of the disk, which has attached thereto a rim felly, secured in such manner that it may be readily removed from the disk when desirable, and which, with the disk, presents an unbroken outer surface which has no tendency to hold dust and dirt and is, therefore, more readily cleanable.

Another object of the invention is the provision of a single disk wheel, having a brake drum integrally formed therewith and constructed in such manner that it can be secured to the outer part of the hub so as to bring both the tire and the brake drum in a common plane with the center of the wheel.

A still further object of the invention, is the provision of a wheel of the single disk type having the hub of the wheel so constructed and related to the disk, and the rim supporting felly so constructed and related to the disk, that its parts may be removably secured to one another and yet present an unbroken outer surface having no tendency to collect dust or dirt.

Further objects of the invention will appear as the following specific description is read in connection with the accompanying drawing which forms a part of this application and in which the figure is a vertical sectional view taken through one embodiment of my invention.

Referring more particularly to the drawing, A, indicates the axle of the vehicle to which is attached in the usual manner the wheel hub ($b$), having a cap ($b^1$) to cover the securing nut. The hub, is shown in this instance provided with an annular flange ($b^2$) which adjacent its outer edge is inwardly offset to produce an annular extension ($b^3$) apertured to receive the securing bolts ($c$) to be hereinafter described. The offset produces a shoulder ($b^4$) which is of a depth equal to the thickness of the disk ($a$).

This disk ($a$) is dished or of truncated cone shape and its inner marginal portion is seated against the shoulder ($b^4$) and provided with apertures corresponding to the apertures in the extension ($b^3$), so as to receive the securing bolts ($c$) whereby the disk may be removably secured to the flange ($b^2$).

The outer marginal portion of the disk ($a$) is laterally offset and extended at right angles to the axis of the disk so as to provide an annular attaching flange ($d^2$) and a shoulder ($a^1$). This shoulder is of sufficient depth to accommodate the inner marginal portion of the rim securing annulus ($f$) which, with the attaching flange ($d^2$) is provided with apertures to receive the attaching bolts ($e$). The annulus ($f$) has formed therewith a substantially right angular flange or extension ($f^1$) to which is attached the usual tire receiving rim ($d$) and in the present instance, this rim is so attached that it is removable as a unit with the annulus ($f$) but it will of course, be understood, that it may be separately removable if desirable.

Where a wheel brake is to be used in connection with this type of wheel, the brake drum is secured integrally with the attaching flange ($d^2$) and forms a right angular annular extension thereof, as shown at ($g$).

In the construction of the wheel shown, it will be seen that the disk ($a$) constitutes the equivalent of spokes in the ordinary wheel, and that the annulus ($f$) is the equivalent of the felly to which the tire rim is secured, but it will be particularly noticed that the outer surfaces of the hub flange, disk and felly, by reason of the particular method of connecting these parts together are all flush with one another and present an unbroken outer surface with no shoulders or grooves to catch dirt or dust. Attention is also called to the fact that the particular form of disk makes it possible to locate the tire and brake drum in the mid plane of the wheel.

The arrangement of seating the inner marginal edge of the annulus ($f$) on the shoulder ($a^1$) and the inner marginal edge of the disk (a) on the shoulder (b⁴) removes the thrust of the wheel from the securing bolts (c) and (e) thus preventing shearing of the bolts and at the same time insuring a flush outer surface which presents a neat appearance and does not collect dirt.

By providing a wheel of this character, the felly and rim may be removed from the disk, or the disk with its attached felly and its associated brake drum, if such is used, may be removed from the hub, and either of the separable parts replaced without the necessity of replacing the entire wheel, thus reducing the cost of repairs and at the same time insuring a wheel of maximum strength.

Having thus described my invention, what I claim and desire to secure by Letters Patents:—

1. In a vehicle wheel, a hub, a rim carrying felly, and a disk detachably connecting the parts so as to present a flush outer surface.

2. In a vehicle wheel, a hub mounted upon the axle of the vehicle, a dished disk connected with the hub, and a rim carrying felly removably connected with the disk.

3. In a vehicle wheel, a hub arranged for mounting on a vehicle axle and having an annular flange, a dished disk connected to said flange, a brake drum and shouldered offset on the disk, and a rim carrying felly removably connected with the disk and engaged with the shouldered offset.

4. In a vehicle wheel, a hub having a flange, a rim supporting felly, a disk interposed between the hub flange and felly and connected to both, and means for connecting the disk to the hub flange and felly, the connection being such that the outer surfaces of the parts are uninterrupted.

5. In a vehicle wheel, a hub having a recessed flange, a disk attached to the flange and having its inner marginal portion lying in the recess, an offset attaching flange at the outer portion of the disk forming a recess, a felly attached to the offset portion of the disk and lying in the recess, the attachment of the disk to the flange and the felly to the disk being such, that the outer surfaces of the parts are flush.

6. In a vehicle wheel, a hub having a disk attaching flange adjacent to its outer edge, a dished inwardly extending disk secured thereto, and a rim supporting felly removably secured to the disk whereby the rim may be located substantially in the transverse mid plane of the hub.

7. In a vehicle wheel, a hub having an attaching flange thereon, a rim supporting felly, a dished disk interconnecting the flange and felly, bolts for connecting the felly to the disk, and means for removing the thrust of the wheel from the bolts.

8. In a vehicle wheel, a hub, a dished disk secured thereto, and a rim supporting felly removably secured to the disk and carrying a rim, said felly located in the transverse mid plane of the hub.

9. In a vehicle wheel, a hub, a dished disk removably secured thereto, a rim secured to the disk and a brake drum integral with the disk and located between the rim and hub and in the mid plane of the wheel.

10. In a vehicle wheel, a hub, a disk secured thereto, a shouldered attaching flange at the outer portion of the disk and a felly removably connected to the attaching flange and engaged with the shoulder, the attachment of the disk to the hub and the felly to the disk being such that the outer surfaces are flush and present an unbroken surface.

11. In a vehicle wheel, a hub having a shouldered flange, a disk removably connected to the flange and engaged with the shoulder, and a felly connected to the outer portion of the disk, the attachment of the felly to the disk and the disk to the flange being such that the outer surfaces are flush and present an unbroken surface.

12. In a vehicle wheel, a hub, a dished disk secured thereto, and a rim supporting annulus secured to the disk the connections being such that the outer face of the wheel presents an unbroken surface.

13. In a vehicle wheel, a hub, a dished disk, a rim supporting felly, means for connecting the parts, and means for removing the thrust of the wheel from the connecting means so as to present an unbroken outer surface.

14. A wheel for motor road vehicles comprising a hub, a truncated cone-shaped sheet metal disk mounted on the outer flange of said hub the larger edge of said disk terminating in a shouldered part lying at right angles to the longitudinal axis of the wheel and said disk being attached to the flange of the hub so that its convex surface forms the outer part of the wheel, an L-shaped annulus detachably mounted on the shouldered part of said disk, and a rim for carrying the tire permanently fixed on the horizontal arm of said annulus.

15. A wheel for motor road vehicles comprising a hub, a truncated cone-shaped sheet metal disk mounted on the outer flange of said hub with its convex face towards the outer end of the hub said disk having its outer part set at right angles to the axis of the hub, a horizontally disposed inwardly projecting flange at the outer edge of said disk and forming part thereof adapted to form a brake drum, an L-shaped annulus detachably mounted on said disk at its outer edge, and a rim for carrying an elastic tire permanently fixed on the horizontal arm of said annulus.

16. A wheel for motor road vehicles comprising a hub having a shouldered flange at its outer end, a truncated cone-shaped sheet metal disk mounted on said flange with its convex face towards the outer end of the hub said disk having its outer edge set at right angles to the longitudinal axis of the hub, and having a shoulder formed in said outer edge, a horizontally disposed inwardly projecting flange at the outer edge of said disk and formed in one with it adapted to form a brake drum, an L-shaped annulus detachably mounted on the shouldered part of said disk, and a rim for carrying an elastic tire permanently fixed on the horizontal arm of said annulus.

JOHN DAVENPORT SIDDELEY.